United States Patent
Header et al.

(10) Patent No.: US 9,038,934 B2
(45) Date of Patent: May 26, 2015

(54) FLY FISHING REEL WITH DRAG SYSTEM

(71) Applicants: Gregory A. Header, Richland, PA (US);
Gregory E. Miller, Pine Grove, PA (US); Timothy Wiest, Hegins, PA (US)

(72) Inventors: Gregory A. Header, Richland, PA (US);
Gregory E. Miller, Pine Grove, PA (US); Timothy Wiest, Hegins, PA (US)

( * ) Notice: Subject to any disclaimer, the term of this patent is extended or adjusted under 35 U.S.C. 154(b) by 0 days.

(21) Appl. No.: 13/693,980

(22) Filed: Dec. 4, 2012

(65) Prior Publication Data
US 2014/0151484 A1 Jun. 5, 2014

(51) Int. Cl.
A01K 89/01 (2006.01)
A01K 89/033 (2006.01)
A01K 89/016 (2006.01)

(52) U.S. Cl.
CPC ............. *A01K 89/033* (2013.01); *A01K 89/016* (2013.01)

(58) Field of Classification Search
USPC .......... 242/246, 295, 297–300, 303, 317, 318
See application file for complete search history.

(56) References Cited

U.S. PATENT DOCUMENTS

| | | | |
|---|---|---|---|
| 2,498,626 A | 2/1950 | Bivans | |
| 3,322,369 A * | 5/1967 | Haenelt, Jr. | 242/269 |
| 3,478,976 A | 11/1969 | Sarah | |
| 3,652,031 A * | 3/1972 | Kosek | 242/269 |
| 3,720,386 A | 3/1973 | Morner | |
| 4,162,049 A * | 7/1979 | Stutz, Jr. | 242/292 |
| 4,544,114 A | 10/1985 | Stauffer | |
| 5,482,221 A | 1/1996 | Peterson et al. | |
| 5,556,049 A * | 9/1996 | Bennett et al. | 242/295 |
| 5,857,632 A * | 1/1999 | Arkowski | 242/297 |
| 5,915,639 A | 6/1999 | Farris | |
| 5,918,826 A * | 7/1999 | Arkowski | 242/295 |
| 5,921,492 A * | 7/1999 | Bauer | 242/317 |
| 6,053,445 A | 4/2000 | Farris | |
| 6,267,312 B1 * | 7/2001 | Farris et al. | 242/295 |
| 6,286,772 B1 | 9/2001 | Koelewyn | |
| 6,382,545 B1 * | 5/2002 | Yeh | 242/317 |
| 6,550,709 B2 * | 4/2003 | Vashro | 242/295 |
| 6,641,071 B1 * | 11/2003 | Yeh | 242/317 |
| 6,851,637 B2 * | 2/2005 | Gilmore | 242/318 |
| 7,431,232 B1 | 10/2008 | Kang | |
| 8,240,590 B2 * | 8/2012 | Danielsson | 242/317 |
| 8,308,097 B2 * | 11/2012 | Hyun | 242/296 |
| 2001/0038053 A1 * | 11/2001 | Vashro | 242/295 |
| 2004/0061011 A1 * | 4/2004 | Gilmore | 242/317 |
| 2010/0181406 A1 | 7/2010 | Kang et al. | |

* cited by examiner

Primary Examiner — Emmanuel M Marcelo
(74) Attorney, Agent, or Firm — Shlesinger, Arkwright & Garvey LLP

(57) ABSTRACT

A fly reel comprises a housing having a back plate, a spindle extending from the back plate, a spool rotatably mounted on the spindle, an adjustable drag assembly fixed to the spool and rotatably mounted with the spool, the adjustable drag assembly is adapted to provide controlled friction against the spool during rotation of the spool, a crank member for rotating the spool in a first direction, and a one way clutch operatively associated with the spindle for permitting rotation of the crank member in the first direction only whereby the spool is adapted to rotate independent of the crank in a second direction that is opposite the first direction. In addition, the drag adjustment knob of the reel is disposed on the same side as the reel crank handle and the drag components may be sealed within a cartridge.

11 Claims, 4 Drawing Sheets

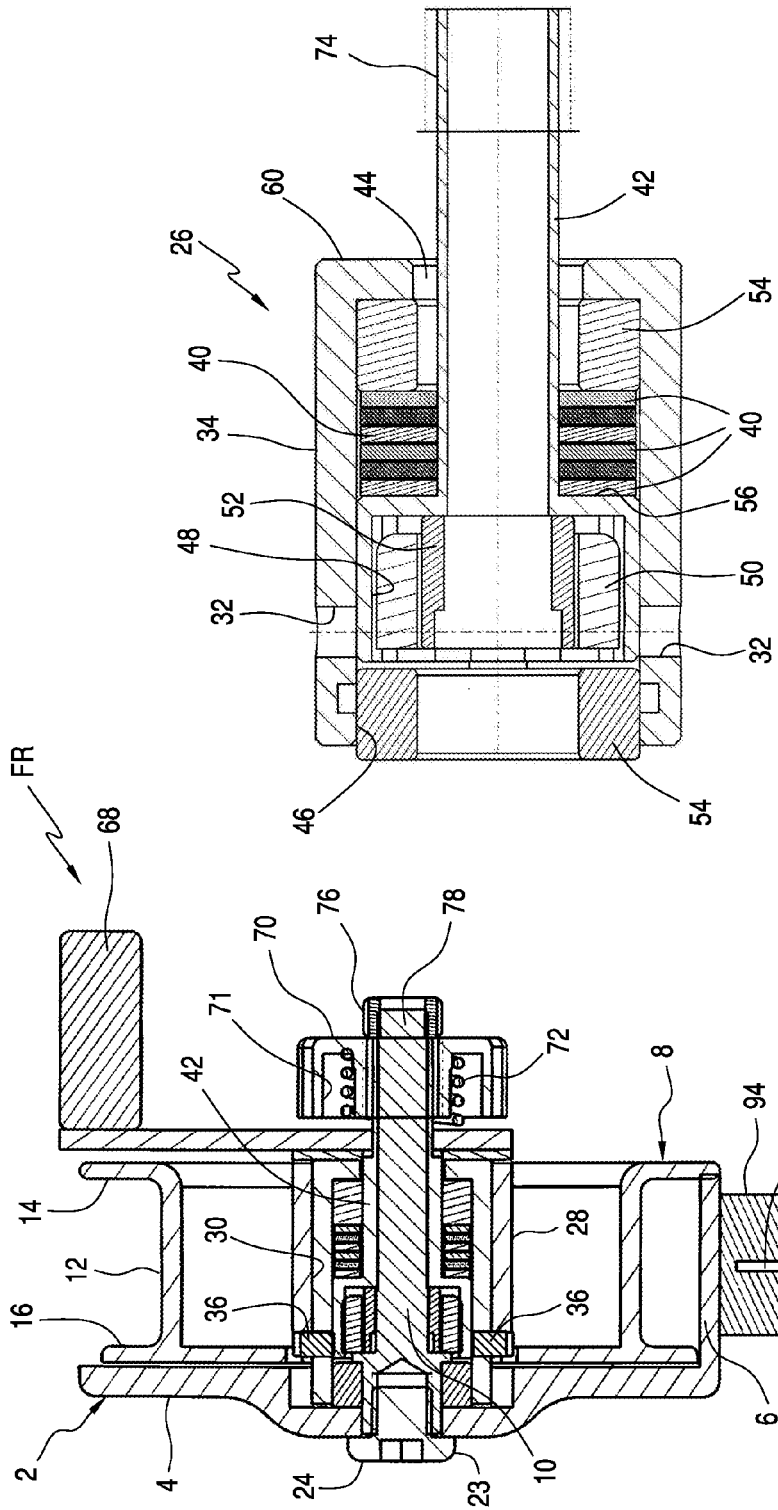

FLY FISHING REEL WITH DRAG SYSTEM

FIELD OF THE INVENTION

This invention relates to fishing reels and in particular, a fly fishing reel having a drag assembly and removable spool.

BACKGROUND OF THE INVENTION

A fly fishing reel will provide several functions. First and foremost it stores the fly line on the reel spool. It will also enable the user to rewind a deployed fly line back onto the spool. A fly fishing reel will often be provided with a drag mechanism that allows the user to make adjustment for forces applied to the fly line and leader. Reel drag permits slippage of the reel spool relative to the reel shaft and crank (or handle) when, for example, a fish applies a force in excess of the strength of the leader. A drag mechanism should allow for quick adjustment since forces applied to the line can arise suddenly and vary greatly depending upon several factors, such as the weight of the fish that is pulling on the line.

Prior art fly reels typically position the drag control knob on the reel side opposite the crank or handle. This is disadvantageous because a fisherman will be forced to temporarily remove his or her hand from the crank in order to adjust the drag. If this occurs when a fish is producing a hard run on the line, the reel is caused to "spool out" whereby excessive line is deployed by the quickly moving fish. This will delay landing of the fish and an excessively slack line can contribute to unhooking of the fish, or snapping of the fly line leader prior to landing.

Prior art fly reels having a handle attached directly to the spool and a drag mechanism may be provided with an anti-reversing mechanism for preventing the reel handle from injuring a fisherman when a very large fish is hooked and the drag has not yet been adjusted to compensate for the strong fish. In that situation, not having an anti-reversing mechanism will result in the handle spinning backwards with great force and possibly injuring the fisherman. The anti-reversing mechanism prevents the handle from rotating with the reel as it rapidly spins in reverse. This is achieved in the prior art by employing a ratchet and pawl mechanism having a frictional engagement means disposed between the pawls and the interior surface of the reel frame to allow for disengagement. Ratchet and pawl mechanisms are subject to premature wear, they lack the capacity for minute adjustment and they apply uneven torsional forces to the reel spool. Another issue with the prior art of this type is the spool may not be removed without disassembly of the drag system and the handle crank. Even in cases where the prior art provides friction washers for purposes of providing drag; such prior art devices do not permit quick replacement of the reel spool.

BRIEF SUMMARY OF THE INVENTION

The invention is a fly fishing reel adapted to prevent the crank handle from spinning backwards as line is being pulled off the reel spool when under drag pressure. This is achieved by providing a line spool that rotates independent of the crank. In addition, the drag adjustment knob of the invention is disposed on the same side as the reel handle for ease of adjustment and the drag components may optionally be sealed within a self contained cartridge. Also, the invention provides a line spool adapted to be quickly removed from the reel by way of a release pin mechanism that is provided on the reel side opposite the crank and drag adjustment knob.

The fly reel comprises a housing having a back plate, a spindle extending from the back plate, a spool rotatably mounted on the spindle, an adjustable drag assembly fixed to the spool and rotatably mounted with the spool, the adjustable drag assembly is adapted to provide controlled friction against the spool during rotation of the spool, a crank member for rotating the spool in a first direction, and a one way clutch operatively associated with the spindle for permitting rotation of the crank member in the first direction only whereby the spool is adapted to rotate independent of the crank in a second direction that is opposite the first direction.

The present invention is also directed to a fly reel comprising a housing having a back plate, a spindle extending from the back plate, a spool rotatably mounted on the spindle, an adjustable drag assembly fixed to the spool and rotatably mounted with the spool, the adjustable drag assembly is adapted to provide controlled friction against the spool during rotation of the spool, a crank member for rotating the spool in a first direction, a one-way clutch mechanism operatively associated with the spindle for permitting rotation of the crank member in the first direction only whereby the spool is adapted to rotate independent of the crank and in a second direction opposite the first direction, and a drag adjustment knob, the drag adjustment and the crank member are adjacent each other and coaxially aligned with the spindle whereby the drag may be adjusted and the crank may be rotated with the same hand of a user.

The present invention is further directed to a fly reel comprising a housing having a back plate, a spindle having a first end and a second end, the first end of the spindle is secured to and extends from the back plate, a spool rotatably mounted on the spindle, an adjustable drag assembly fixed to the spool and rotatably mounted with the spool, the adjustable drag assembly is adapted to provide controlled friction against the spool during rotation, a crank member for rotating the spool in a first direction, the crank member is secured at the second end of the spindle, a one way clutch mechanism operatively associated with the spindle for permitting rotation of the crank member in the first direction only whereby the spool is adapted to rotate independent of the crank in a second direction that is opposite the first direction, and a spool release assembly, the spool release assembly including a pin provided at the first end of the spindle and coaxial therewith and having a first position for fixedly securing the spool on the spindle and a second position for releasing the spool.

BRIEF DESCRIPTION OF THE SEVERAL VIEWS OF THE DRAWINGS

FIG. 4 is a cross-sectional view taken along lines 4-4 of FIG. 1;

FIG. 5 is an enlarged cross-sectional view of the sealed drag cartridge shown in FIG. 4.

DETAILED DESCRIPTION OF THE INVENTION

Figure 2:
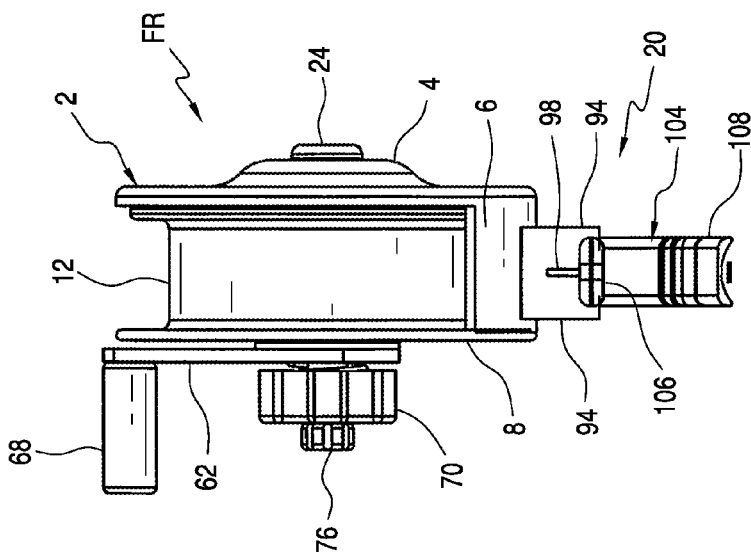
FIG. 2 is a plan view in elevation of the fly fishing reel according to the invention shown in FIG. 1.

Turning to FIGS. 1 through 4, a fly reel FR according to one embodiment of the invention is shown and comprises a reel spool 8 rotatably supported on a spindle 10 secured at one end to a housing 2.

Reel housing 2 having a circumferential back plate or side wall 4 and flange portion 6 that extends transverse from side wall 4 and to which is mounted a foot assembly 20 for adjustably securing reel FR to a fly rod (not shown).

Spool 8 comprises a tubular portion 12 having radially extending side walls 14, 16 that cooperate to provide a channel around which a fly line (not shown) may be stored. The depth and width of the storage channel is variable. In the embodiment shown in FIG. 4, side wall 14 has a diameter greater than side wall 16 but generally equal to the diameter of reel housing side wall 4. Spool 8 is provided with a centrally disposed spool hub 28 having an interior race surface 30. Hub 28 is provided with a pair of locking recesses 30 that extend though the hub for purposes of securing a drag assembly as will be further explained below.

Figure 6:
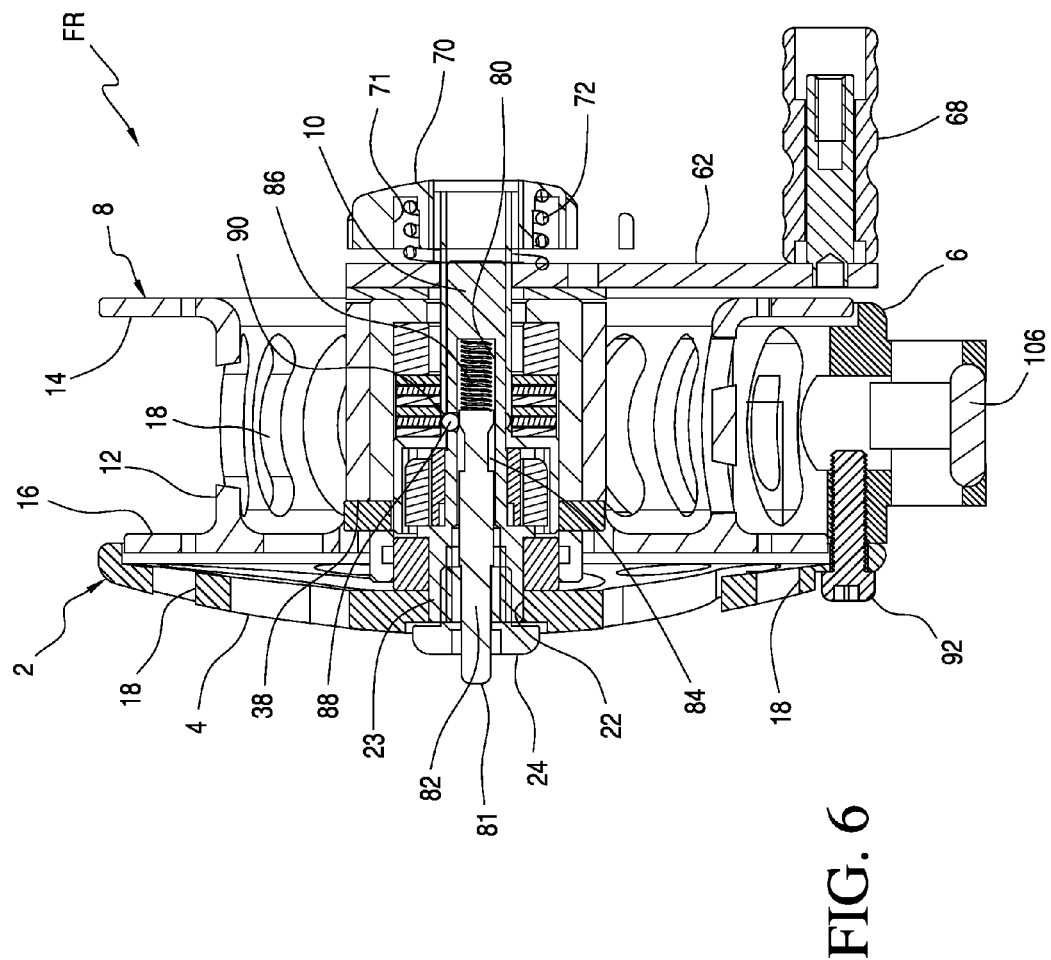
FIG. 6 is a cross-sectional view of an alternative embodiment of the fly fishing reel shown in FIG. 4.

In an embodiment best shown in FIG. 6, the reel housing 2, reel spool 8 and tubular portion 12 are provided with passageways 18 of varying size and shape that extend through these structures to reduce the weight of the reel.

Figure 3:
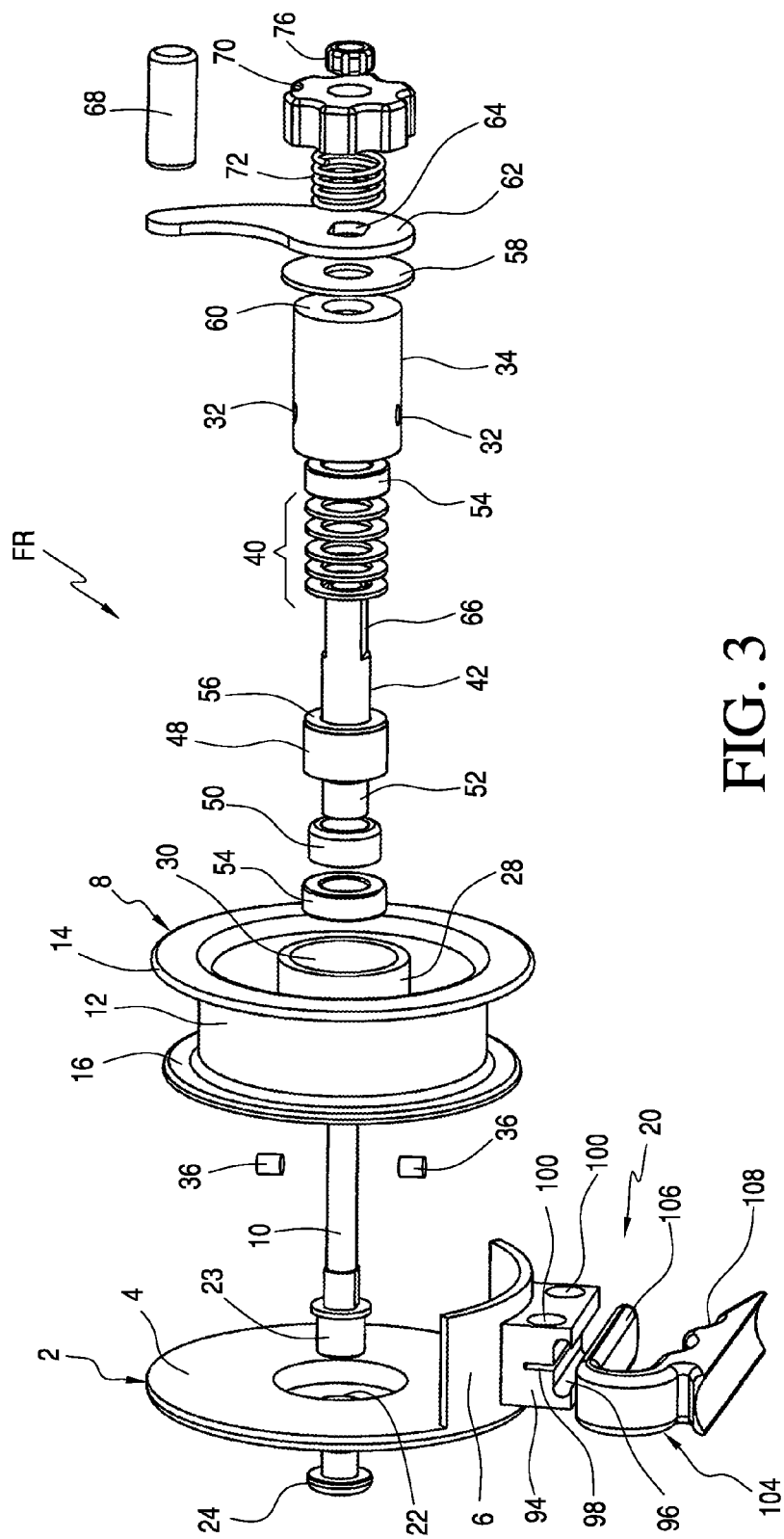
FIG. 3 is an exploded perspective view of the fly fishing reel according to the present invention.

As best shown in FIGS. 3 and 4, spindle 10 extends through a central passageway 22 of the reel housing 2. The reel housing 2 is secured to an end 23 of the spindle 10 by a threaded cap member 24. Spindle 10 also extends though the drag assembly 26. The drag assembly 26 is fixed against the spool hub 28 at an interior race surface 30. In particular, the housing 34 of the drag assembly 26 is provided with a pair of locking recesses 32 and the spool hub is provided with a cooperating pair of locking recesses 38. A pair of locking recesses 32 and 38 is adapted to receive one of locking pins 36 to fix the drag assembly 26 to the reel spool 8 after aligning the locking recesses 38 of the spool hub 28 and the locking recesses 32 of the drag assembly housing 34. This enables the drag assembly 26 to rotate with the reel spool 8.

Turning to FIG. 5, the pressure driven drag assembly 26 is shown in detail. The drag assembly components are sealed within a housing 34 provided with a narrow opening 44 at one end and second, larger diameter opening 46 at an opposite end. A spool sleeve 42, adapted to receive rotating spindle 10, is coaxially aligned within the longitudinal axis of the drag housing 34. One end of the spool sleeve 42 is provided with an expanded diameter section 48. A one way clutch 50 is provided within the expanded diameter section 48 of the spool sleeve and is fixed in place by a clutch sleeve 52. The one way clutch 50 is a roller type clutch that permits rotation in one direction but restricts rotation in an opposite direction. A sealed bearing 54 is provided at each end of the drag housing 34.

The reduced diameter section of spool sleeve 42 receives a series of individual friction washers 40 that are sandwiched against an abutment 56 of the spool sleeve expanded diameter section 48, interior of bearing 54. Use of different compositions and materials for the friction washers will offer correspondingly varying drag potentials and settings. When using the reel embodiment of the present invention having a quick release pin (FIG. 6), a fisherman can carry a second spool outfitted with either the same or a different type of line corresponding to a different drag configuration. This feature is especially useful for salt water environment where different species of fish become available to catch during short periods of time. In one embodiment, the housing 34 can be offered whereby it is sealed at both ends and is filled with lubricating oil. An oil filled system allows the reel to withstand complete submersion while fishing without damage to the drag components. This feature is especially advantageous for surf fishing in salt water where waves often submerge a fishing reel.

A main washer 58 is provided on spool sleeve 42 between an end face 60 of the drag housing 34 and a crank member 62. Crank member 62 has an opening 64 that keyed to fixedly receive a chamfered end 66 of the spool sleeve 42 whereby rotation of the crank member 62 will likewise rotate spool sleeve 42. A crank knob 68 is fixed to an end of crank member 62 and preferably in a manner that permits knob 68 to rotate about its longitudinal axis when manually rotating the crank.

A drag knob 70, having an interior recess 71 for receiving a drag spring 72, is threadedly engaged onto a threaded end portion 74 of the spool sleeve 42. The drag knob 70 is freely rotatable on the spool sleeve so that it selectively increase or decrease tension of spring 72 against the crank 62. As best seen in FIG. 4, a spool retainer cap 76 may be provided and threadedly engage with the end portion 78 of the spindle 10 to retain the drag assembly and associated crank components on the spool sleeve 42 and the spindle 10.

FIG. 6 illustrates an alternative embodiment of the invention. Reference numbers in this figure correspond to those in the earlier figures except where noted below. This embodiment enables a user to change the reel spools without affecting the drag setting. In this embodiment, the spindle 10 is provided with a central passageway 80 coaxial with the longitudinal axis of the spindle 10. A pin member 82 having an end 81 and a detent region 84, is received within the passageway 80 of spindle 10. The screw cap member 24 contains a central opening through which the end 81 of pin member 82 extends. The detent region 84 is operatively associated with a detent ball 88 that normally rests within an annular groove 90 that extends within the spindle 10 and spool sleeve 42.

Under the action of spring 86, pin member 82 is maintained in a locked position whereby detent ball 88 is engaged with annular groove 90 and drag assembly 26 is fixedly secured to the spindle 10. To remove the entire spool assembly and drag assembly from the reel, a user will press the end 81 of pin member 82 sufficient to compress spring 86 so that detent portion 84 will receive detent ball 88 and no longer be engaged within the annular groove 90 of spool sleeve 42. The reel spool with drag assembly, the crank and drag knob may then be removed from the spindle 10. A substitute spool having different line capacity and drag setting may then be inserted onto the spindle.

In addition to the above, the embodiment shown in FIG. 6 provides a flange portion 6 that is not unitary with the reel housing 2. In this embodiment the flange portion 6 is a separate piece that is secured to the reel housing 2 by a series of securing members 92, and in particular, a threaded fastener. As is apparent, other devices for securing flange portion 6 to the housing are within the scope of the present invention so long as it provides a rigid and fixed connection.

Figure 1:
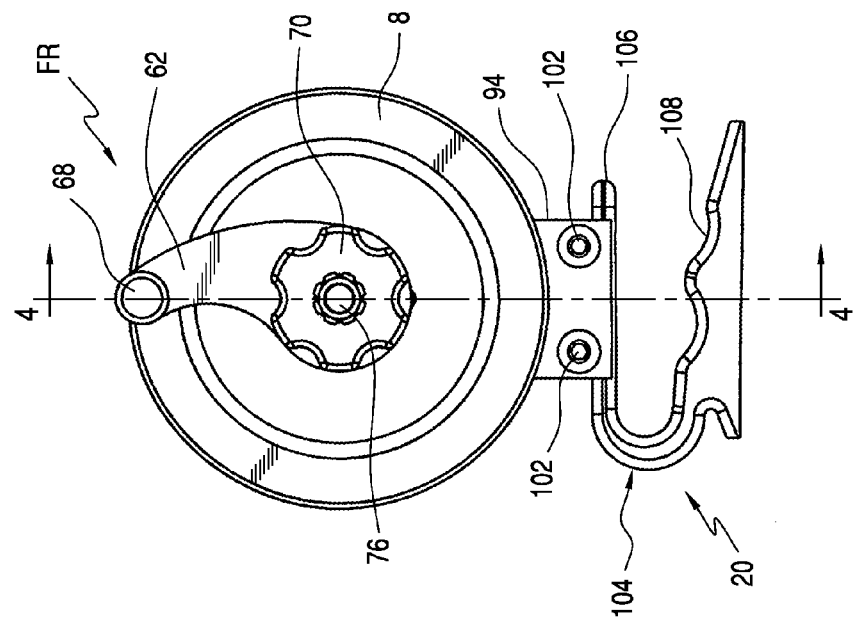
FIG. 1 is a side elevational view of the fly fishing reel according to the present invention including the adjustable reel foot system.

Turning to FIGS. 1 and 3, an adjustable mounting foot assembly 20 is shown in greater detail. The mounting foot assembly 20 comprises a pedestal 94 that extends from the flange portion 6 of the reel housing 2 and can be seen to have an arcuate surface where it abuts against flange portion 6. The pedestal 94 may be unitary with the flange portion 6 of the reel housing 2. In the alternative, the pedestal 94 is a separate piece that is bolted or otherwise secured to the flange portion 6. At an opposite side, the pedestal 94 is provided with a recess 96 that extends along the longitudinal axis of the pedestal 6, the recess 96 further including a longitudinal slot 98 coextensive with recess 96 and extending transverse to the recess. Passageways 100 extend through pedestal 94 and slot 98 and each receives a clamping screw 102.

The reel foot member 104 has a generally U-shaped configuration. One end of the foot member 104 is provided with a male portion 106 shaped to mate with and slidingly engage pedestal recess 96. An opposite end of foot member 104 may be provided with an ergonomic configuration 106 for receiving the fingers of a user's hand. As is apparent, once the foot member is secured to the reel seat of a fly rod (not shown), the position of the reel FR relative to the rod may be adjusted by moving the male portion 106 within recess 96 following by tightening adjustment screws 102 to lock the foot member 104 into place. The U-shaped configuration of the foot member 104 enables a user to grasp the fly rod directly above the fly reel FR and by adjusting the reel forward or backward of the reel seat on the fly rod, improved balance is provided.

Crank knob 68 is attached to the end of handle crank 62. Handle crank 62 has a keyed opening 64 that is adapted to interfit the end 66 of the spool sleeve 42 so that rotation of the handle crank 62 will cause spool sleeve 42 to likewise rotate. Mounted on the sleeve 42 is a one way clutch 50 that is adapted to rotate freely in one direction but not rotate in an opposite direction. The reel spool 8 is rigidly mounted to the drag assembly housing 34. A series of drag washers 40 are provided around the spool sleeve 42 and interior of the drag assembly housing 34 to provide friction. Accordingly, when a user rotates crank member 62 by handle 68 it likewise rotates the spool 8 as a single unit. If any force lower than the setting on the drag is transmitted to rotate the spool backwards, the one way clutch will not permit the spool 8 and crank member handle to spin backward. Conversely, if a force greater than the drag setting is applied to the spool 8, the crank member 62 will not rotate backwards because it is directly connected to the one way clutch 50. Since the force is greater than the drag setting force, the reel spool 8 will rotate backwards and at a controlled rate per the setting applied to the drag washers 40.

A user may adjust the drag tension to correspond to changes in the forces applied to the line by a hooked fish without the possibility of the crank being subjected to backlash during the adjustment. This is accomplished by letting go of the crank 62 and then turning the drag adjustment knob 70. Interior of the drag knob 70 is a drag spring 72 which rests against the crank member 62. The drag spring 72 exerts a force on the crank member 62 which then exerts a force on the drag housing 34. The drag housing 34 and the crank member 62 slide over the spool sleeve 42 and compress the drag washers 40. The crank member 62 is keyed at opening 64 to the spool sleeve 42 but the drag housing 34 is not keyed to the spool sleeve 42 and therefore is adapted to rotate radially around the spool sleeve 42. This provides the adjustable friction between the drag housing 34 and the spool sleeve 42.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

We claim:

1. A fishing reel comprising:
a) a housing having a back plate;
b) a spindle extending from the back plate;
c) a spool rotatably mounted on the spindle, the spool having first and second faces that are mirror images of each other, the first spool face is adjacent the back plate of the housing;
d) an adjustable drag assembly fixed to the spool and rotatably mounted therewith, the adjustable drag assembly adapted to provide controlled friction against the spool during rotation thereof;
e) a crank member for rotating the spool in a first direction, the crank member is adjacent the second spool face;
f) a one way clutch operatively associated with the spindle for permitting rotation of the crank member in the first direction only, whereby the spool is adapted to rotate independent of the crank in a second direction that is opposite the first direction;
g) a drag adjustment knob, the drag adjustment knob is adjacent the second spool face and the crank member whereby the drag may be adjusted and the crank may be rotated by the same hand of a user; and
h) a spool sleeve overlying the spindle and selectively rotatable therearound, the crank member is fixedly secured to the spool sleeve wherein the spool sleeve has an end that is keyed to receive the crank member and the one way clutch is fixed to the spool sleeve.

2. A fishing reel as in claim 1 and wherein the drag assembly comprises a series of friction washers adapted to be selectively compressed so as to generate drag on the spool.

3. A fishing reel as in claim 1 and wherein the drag assembly and the one way clutch are coaxially aligned on the spindle.

4. A fishing reel as in claim 1 and wherein the drag assembly is filled with oil and sealed.

5. A fishing reel as in claim 1 and further comprising:
a) a housing encasing the adjustable drag assembly, the housing having first and second end faces, the crank member and the drag adjustment knob are adjacent the housing end face.

6. A fishing reel as in claim 5 and further including a spring member disposed between the drag adjustment knob and the crank member.

7. A fishing reel as in claim 1 and wherein the spool sleeve end is chamfered.

8. A fishing reel comprising:
a) a housing having a back plate;
b) a spindle having a first end and a second end, the first end of the spindle is secured to and extends from the back plate;
c) a spool rotatably mounted on the spindle, the spool having first and second faces that are mirror images of each other, the first spool face is adjacent the back plate of the housing;
d) an adjustable drag assembly fixed to the spool and rotatably mounted therewith, the adjustable drag assembly is adapted to provide controlled friction against the spool during rotation thereof;
e) a crank member for rotating the spool in a first direction, the crank member is secured at the second end of the spindle and is adjacent the second spool face;
f) a one way clutch operatively associated with the spindle for permitting rotation of the crank member in the first direction only, whereby the spool is adapted to rotate independent of the crank in a second direction that is opposite the first direction;
g) a spool release pin assembly, the spool release pin assembly provided at the first end of the spindle and coaxial therewith and having a first position for fixedly securing the spool on the spindle and a second position for releasing the spool including the adjustable drag assembly from the spindle;
h) a drag adjustment knob, the drag adjustment knob is adjacent the second spool face and the crank member whereby the drag may be adjusted and the crank may be rotated using the same hand; and
i) a spool sleeve overlying the spindle and selectively rotatable therearound, the crank member is fixedly secured to the spool sleeve wherein the spool sleeve has an end that is keyed to receive the crank member and the one way clutch is fixed to the spool sleeve.

9. A fishing reel as in claim 8 and wherein the drag assembly comprises a series of friction washers adapted to be selectively compressed so as to generate drag on the spool.

10. A fishing reel as in claim 8 and wherein the drag assembly and the one way clutch are coaxially aligned on the spindle.

11. A fishing reel as in claim 8 and wherein the spool sleeve end is chamfered.

* * * * *